Oct. 18, 1927.

G. C. LLOYD 1,645,994

AGRICULTURAL IMPLEMENT

Filed June 22, 1925

INVENTOR
GLOVER CYRUS LLOYD
BY
ATTORNEYS

Patented Oct. 18, 1927.

1,645,994

UNITED STATES PATENT OFFICE.

GLOVER CYRUS LLOYD, OF VANCOUVER, BRITISH COLUMBIA, CANADA.

AGRICULTURAL IMPLEMENT.

Application filed June 22, 1925. Serial No. 38,857.

My invention relates to improvements in agricultural implements the objects of which are to provide means whereby land may be so packed and treated after ploughing and harrowing as to retain its moisture content for the germination and growing of the seed and grain and for preventing the disturbance of the seed from high winds and the subsequent loss of crop to the user.

The invention consists essentially of a rotary packer which may be weighted as desired, which is adapted to form a plurality of furrows and means carried rearwardly of the packer for filling in the furrows with loose soil, as will be more fully described in the following specification in which:—

In the drawings like characters of reference indicate corresponding parts in each figure.

Figure 1:
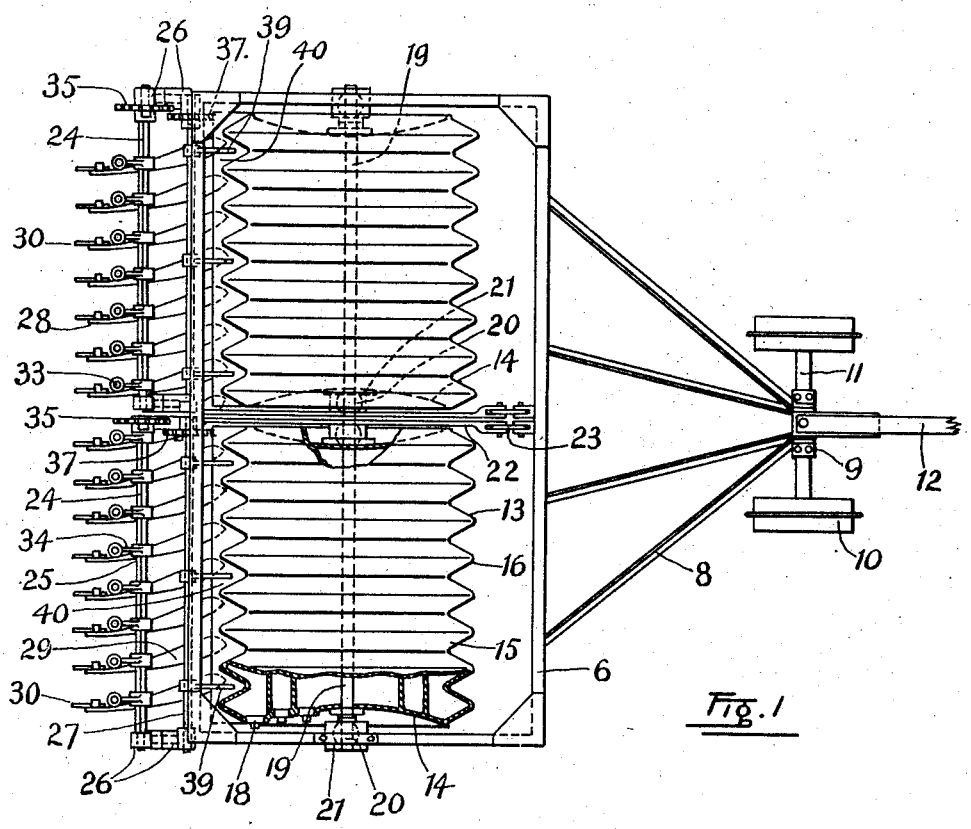
Fig. 1 is a plan view of my invention with the platform removed.

The numeral 1 indicates a rectangular sub-frame having a front member 2, a detachable rear member 3 and end members 4, and supported above the frame by corner supports 5 is a further frame 6 of similar construction upon which a platform 7 or boxes are disposed to facilitate additional loading of the implement with stones or other suitable weights if desired. Extending from the front member 2 of the sub-frame 1 are draw bar members 8 converging at their forward ends and having pivotal connection to a pole carriage generally indicated by the numeral 9. The pole carriage is provided with a pair of wheels 10 suitably mounted upon an axle 11 and is adapted for connection to a hauling media by a pole 12 and is similar in other respects to the pole carriage in common use on binders and other agricultural implements.

Figure 2:
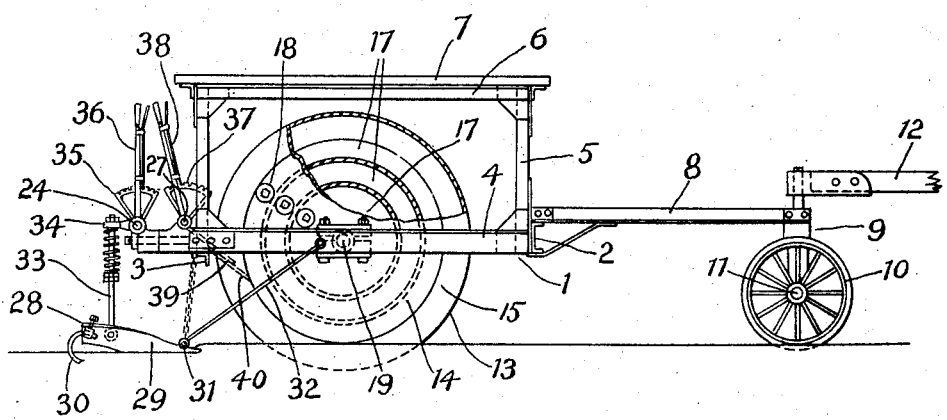
Fig. 2 is an end view, part in section.

The numeral 13 indicates a plurality of rotary packers or rollers having end walls 14 and side walls 15 which are divided into a plurality of circumferential corrugations 16. The rollers 13 are each divided into a plurality of cylindrical compartments 17, see Figure 2, each of which are of different cross sectional area and are in consequence capable of being loaded with different weights of water or sand, so that the owner knowing the weight of each compartment can load such compartment as may be needed to suit the work he desires to do. Each of the compartments 17 are provided with a filler plug 18 through which any suitable ballast may be introduced or withdrawn as required. The rollers 13 are each mounted upon a shaft 19 journalled at opposite ends in a spherical bearing 20 which is carried in a journal block 21 having concave surfaces conforming to the exterior of the bearing to provide for any movement of the shaft which may be caused by the irregularity of the ground traversed by the implement. The outer journal blocks 21 are mounted upon the end members of the sub-frame 1 and the inner blocks are each mounted upon a member 22 which is connected at its forward end to the front member 2 of the sub-frame by a link 23.

Rockingly mounted along the rear of the sub-frame is a cultivator bar 24 which is divided into as many sections 25 as there are rollers. The sections are connected at opposite ends by universal joints 26 to the end members 4 and the members 22. A scraper bar 27 is also mounted in sections in an exactly similar manner between the end members 4 and the members 22. By providing connecting links 23 between the front sub-frame member 2 and the members 22 and also the universal joints 26 on the bars 24 and 27 between the members 22 and the end sub-frame members 4 the rollers are free to tilt endwise as required to conform to the ground surfaces.

The numeral 28 indicates generally a plurality of cultivators which consists of a cultivator blade 29 fashioned somewhat like a plow share but adapted to remove one ridge of ground formed on the sides of each furrow and to turn the soil so entered to fill the furrow, thereby leaving the soil relatively level, and at the rear of each cultivator and adjustably attached thereto by suitable means is a spring harrow tooth 30 which harrows the ground immediately below the opposite ridge of the furrow filled by the cultivator. The forward end of the cultivator blades 29 are connected together by a light rod 31, the ends of which are coupled to the sub-frame members 4 and 22 by eyed rods 32, and are also suspended from the rear member 3 by a pair of chains which serve to prevent them from cutting too deeply into the ground. The rear end of the cultivator blades are each connected by a spring tensioned rod 33 depending from an eyed crank 34 secured upon the cultivator bar 24.

The numeral 35 indicates a plurality of quandrants mounted upon one of the universal joints 26 each of which is engaged by a lever 36 secured to one end of each cultivator rod for the purpose of adjusting the cut of the cultivator blades and harrow teeth 30 with respect to each of the rollers 13. The numeral 37 indicates a plurality of quandrants mounted in a similar manner to the quadrants 35 immediately to the rear of the rear sub-frame member 3 having a lever 38 engaging therewith which is adapted to rock a rod 39 extending parallel to the subframe member 3 upon which rod scrapers 40 are secured, which are adapted to project into the corrugations of the rollers to prevent soil or stones from becoming wedged therein.

Having thus described the several parts of my invention I will now briefly explain its use.

The rollers are first suitably loaded and the implement connected to a tractor or other hauling media and is drawn over the ground which has been summer fallowed or otherwise turned to a suitable depth. The weight of the rollers in travelling over the ground pack the soil to a suitable depth and form a corrugated crust which is substantially proof against the evaporation of moisture from the subsoil, and is also proof against wind disturbance. The ridges of this corrugated crust are levelled off by the cultivators 29 and the soil so removed is deposited by them into the corrugations which hold it in so confined a space as to prevent its disturbance by subsequent winds, so that this loose soil provides a mulch in which seeds will germinate freely and also serve to prevent the crust previously mentioned from caking up with the action of the sun, which is common with soil packed by present implements.

The cultivators are set by means of the levers 36 to cut to any desired depth, and can also be withdrawn from contact with the ground by thrusting the lever well forward on its quadrant 35 to permit the implement being easily turned when desired.

What I claim as my invention is:

1. In combination with a frame carrying a corrugated ground packing roller the provision of a plurality of cultivator blades suspended from the frame close to and rearwardly of said roller and positioned to level off the ridges of the corrugations formed in the ground by the roller and to deposit the soil thus disturbed into the valleys formed between said ridges and a harrow tooth carried by the rear end of each blade.

2. An agricultural implement as recited in claim 1 in which the means suspending the cultivator blades from the frame comprises links connected between the frame and the forward ends of said blades, a rod carried by the frame rearwardly of the ground packing roller and in parallel relation therewith, said rod being equipped with a plurality of cranks and a spring tensioned rod connection between each crank and the rear portion of one of the cultivator blades.

3. In combination with a frame carrying a corrugated ground packing roller, a cultivator and harrow attachment comprising a plurality of cultivator blades arranged rearwardly of the ground packing roller and adjacent thereto, said blades being positioned to level off the ridges of the corrugated crust formed in the ground by the roller and to deposit the soil thus disturbed in the valleys formed between said ridges, a harrow tooth carried by the rear end of each blade and positioned to harrow the ground immediately below the opposite ridge of the furrow filled by the blade and means for supporting the cultivator blades from said frame comprising a vertically adjustable spring tensioned rod connected between the rear portion of each blade and the frame and a link connection between the frame and the forward portion of each blade.

Dated at Saskatoon, Saskatchewan, this 2nd day of June, 1925.

GLOVER CYRUS LLOYD.